US008769432B1

(12) United States Patent
Rhyne et al.

(10) Patent No.: US 8,769,432 B1
(45) Date of Patent: Jul. 1, 2014

(54) METHOD AND SYSTEM FOR A BROWSER MODULE

(75) Inventors: Clifford L. Rhyne, San Diego, CA (US); Larry John Raab, Poway, CA (US); Gang Wang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 78 days.

(21) Appl. No.: 13/281,661

(22) Filed: Oct. 26, 2011

Related U.S. Application Data

(63) Continuation of application No. 11/932,229, filed on Oct. 31, 2007, now Pat. No. 8,078,986.

(51) Int. Cl.
*G06F 17/00* (2006.01)
(52) U.S. Cl.
USPC .......... 715/789; 715/226; 715/800; 715/231; 715/253; 715/273; 715/708; 715/741; 715/764; 715/232; 715/233; 715/801; 715/802; 715/803; 715/804; 715/805; 715/706; 715/807; 715/808; 715/809; 715/810; 715/811; 715/812; 715/813; 715/814; 715/817; 715/818; 715/819; 715/820; 715/821; 715/822; 715/823; 715/824; 715/825; 715/826; 715/827; 715/828; 715/829; 715/234; 705/4; 705/40

(58) Field of Classification Search
USPC ......... 715/205, 226, 780–829, 234–234, 253, 715/273, 708, 741–764; 709/203, 206; 705/4, 14, 34, 40; 701/211, 431–532
See application file for complete search history.

(56) References Cited

U.S. PATENT DOCUMENTS

| | | | |
|---|---|---|---|
| 5,948,040 A * | 9/1999 | DeLorme et al. ............. 701/426 |
| 6,446,048 B1 * | 9/2002 | Wells et al. ...................... 705/35 |
| 6,681,223 B1 | 1/2004 | Sundaresan | |
| 2003/0052916 A1 | 3/2003 | Stern | |
| 2003/0088487 A1 | 5/2003 | Cheng et al. | |
| 2008/0319808 A1 * | 12/2008 | Wofford et al. ................... 705/6 |
| 2009/0089176 A1 | 4/2009 | McCabe | |

* cited by examiner

*Primary Examiner* — Quoc A Tran
(74) *Attorney, Agent, or Firm* — Osha Liang LLP

(57) ABSTRACT

In general, the invention relates to a method for capturing information from a web site. The method includes accessing the web site using a browser with a browser module, where the web site comprises a number of web pages having information in a first format, and obtaining a profile corresponding to the web site, where the profile defines a manner to capture information in a first format from the web site. The method further includes capturing information, by the browser module, from at least one of the number of web pages based on the profile and sending the information captured by the browser module to a destination application, where the destination application is external to the browser and where the destination application is configured to use the information in a second format.

28 Claims, 8 Drawing Sheets

METHOD AND SYSTEM FOR A BROWSER MODULE

CROSS-REFERENCE TO RELATED APPLICATIONS

This application is a continuation of U.S. patent application Ser. No. 11/932,229, filed on Oct. 31, 2007, and entitled: "METHOD AND SYSTEM FOR A BROWSER MODULE." Accordingly, this application claims benefit of U.S. patent application Ser. No. 11/932,229 under 35 U.S.C. §120. U.S. patent application Ser. No. 11/932,229 is hereby incorporated in its entirety.

BACKGROUND

Web sites on the World Wide Web ("Web") provide a multitude of services to users and organizations. For example, a user may employ a web site to host email, manage credit cards, pay bills, plan trips, oversee health records, and/or administer any digital information pertinent to the user and/or an organization associated with the user. Typically, web sites that provide services are owned and/or operated by disparate entities. Moreover, each entity that provides a web site service may possess a proprietary authentication system, requiring the user to remember account information (e.g., username and password) for each service.

The information stored and/or provided by web site services may be useful to applications external to the web site services. For example, the user may want credit card transactions, supplied via a financial institution web site, imported into a financial application running on the user's computer system, e.g., QuickBooks® (QuickBooks® is a registered trademark of Intuit, Inc. of Mountain View, Calif.). Because the information is supplied through the browser, no simple means exists to import the information, and the user is required to manually enter the same information from the web page into the financial application.

SUMMARY

In general, in one aspect, the invention relates to a method for capturing information from a web site. The method includes accessing the web site using a browser with a browser module, where the web site comprises a number of web pages having information in a first format, and obtaining a profile corresponding to the web site, where the profile defines a manner to capture information in a first format from the web site. The method further includes capturing information, by the browser module, from at least one of the number of web pages based on the profile and sending the information captured by the browser module to a destination application, where the destination application is external to the browser and where the destination application is configured to use the information in a second format.

In general, in one aspect, the invention relates to a computer readable medium including computer readable instructions embodied therein for causing a computer system to perform accessing the web site using a browser with a browser module, where the web site comprises a number of web pages having information in a first format, and obtaining a profile corresponding to the web site, where the profile defines a manner to capture information in a first format from the web site. The computer readable instructions further for causing the computer system to perform capturing information, by the browser module, from at least one of the number of web pages based on the profile and sending the information captured by the browser module to a destination application, where the destination application is external to the browser and where the destination application is configured to use the information in a second format.

Other aspects of the invention will be apparent from the following description and the appended claims.

DETAILED DESCRIPTION

Figure 1:
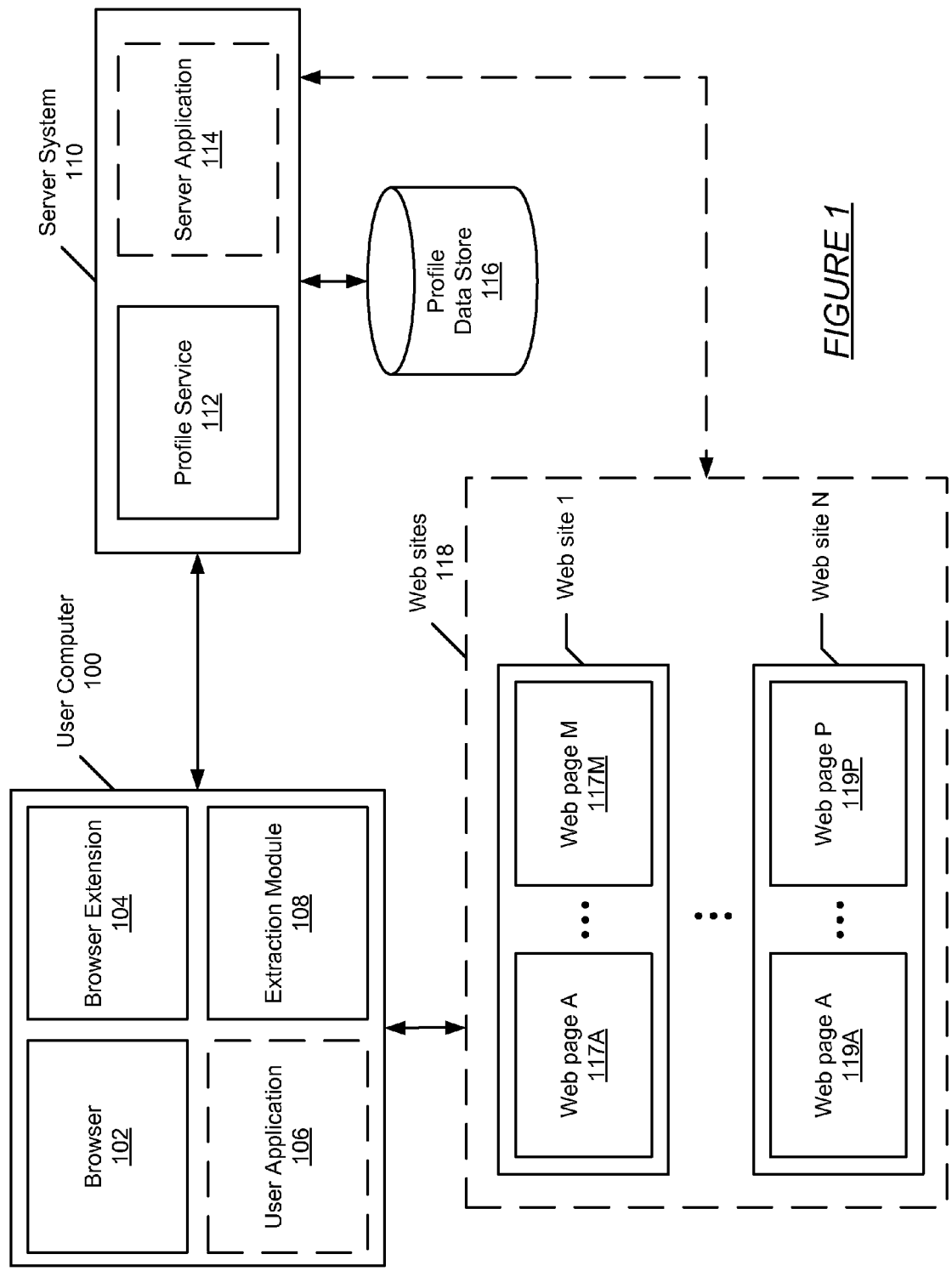
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for capturing information from a web site. More specifically, embodiments of the invention permit a web browser module to capture information from a web site and send the information to an destination application.

FIG. 1 shows a system for capturing information from a web site in accordance with or more embodiments of the invention. The system includes a user computer (100), a server system (110), and one or more web sites (118). Each of the web sites (118) includes one or more web pages (117A, 117M, 119A, 119P).

The user computer (100) includes a browser (102), a browser module (104), a user application (106) (optional), and an extraction module (108). The user computer (100) is operatively connected to the server system (110), which includes a profile service (112) and a server application (114) (optional). In one or more embodiments of the invention, the server system (110) may be configured to communicate with the profile data store (116).

In one or more embodiments of the invention, the user computer (100) may be operated by any user (not shown) capable of operating the browser (102) and possessing an account for a web service. For example, the user may be a consumer, a vendor, a banker, a small business owner, a doctor, and/or any other individual capable of operating the browser (102) on the user computer system (100).

In one or more embodiments of the invention, a destination application (e.g., user application (106) and server application (114)) is software for manipulating and/or analyzing information related to the user. For example, the destination application (e.g., user application (106) and server application (114)) may be financial software (e.g., QuickBooks®) for tracking user financial information. In one or more embodiments of the invention, the user application (106) may be resident on the user computer system. In further embodiments of the invention, the server application (114) may be resident on the server system (110) of the organization hosting the profile service (112) and/or a computer system hosted by a third-party (not shown). In one embodiment of the invention, the destination application may correspond to a web service.

In one or more embodiments of the invention, the browser (102) is configured to navigate web sites using the Hypertext Transmission Protocol (HTTP). For example, the browser (102) may be Microsoft® Internet Explorer® and Mozilla® Firefox® (Microsoft® and Internet Explorer® are registered trademarks of Microsoft Corporation of Redmond, Wash.; Mozilla® and Firefox® are registered trademarks of the Mozilla Foundation of Mountain View, Calif.).

Continuing with FIG. 1, the browser module (104) is operatively connected to the browser (102). In one or more embodiments of the invention, the browser module is configured to retrieve profiles from the profile service (112) associated with web sites visited by the browser (102). Profiles from the profile service (112) include information that defines how to extract information from the web site. For example, the profiles include regular expressions, Bachus-Naur form grammars, Extensible Stylesheet Language Transformations (XSLT), and/or any suitable information that may be used by the extraction module to extract data from the web site. In one embodiment of the invention, the profile may identify which web pages within a given web site include data that may be extracted. In such cases, the profile may include specific information about how to extraction information from the web site on a per-web page basis.

In an another embodiment of the invention, the profiles (or portions thereof) may be stored on the user computer (100). In such cases, the browser module (104) may be configured to query both the user computer (100) and the profile service (112) to obtain the profiles.

In one or more embodiments of the invention, the browser module (104) may be further configured access the Application Programming Interface (API) of the browser (102) to determine the Uniform Resource Locator (URL) of web sites visited and to modify web pages before the pages are presented to the user via the browser (102). For example, when a user directs the browser (102) to visit a web mapping service the browser module may query the browser's API to determine that the browser (102) is visiting the "http://www.map-example.com/" web site, and may modify visited web pages by inserting a Hypertext Markup Language (HTML) button to indicate that information presented on the web page may be captured and sent to the destination application (e.g., user application (106) and server application (114)).

In one or more embodiments of the invention, the browser module (104) may be configured to present a Graphical User Interface (GUI) enabling the user to select a destination application (e.g., user application (106) and server application (114)) to send extracted information from the web page. The GUI may also be configured to allow the user to modify the extracted information before it is sent to the destination application (e.g., user application (106) and server application (114)).

The browser module (104) communicates with the server system (110) via a network (not shown). The network may be a wide area network (WAN), a metropolitan area network (MAN), a local area network (LAN), a public network (such as the Internet or World Wide Web), a wireless network, a telephony network, a mobile telephony network, or any combination thereof. Further, the network may include one or more networks interconnected by other network types (e.g., distinct LANs connected by one or more WANs).

In one or more embodiments of the invention, the server system (110) is configured to store profile information associated with web sites in a profile data store (116), and serve up the profile information to browser modules (104) via the profile service (112). The profile data store (116) may be any device or medium capable of storing profile information. For example, the profile data store (116) may be one or more databases, a directory service, one or more flat files, a spreadsheet, an extensible markup language (XML) file, or any other suitable data repository. In one or more embodiments of the invention, the profile data store (116) may be hosted on a data server (not shown) maintained by a third party. Further, the profile data store (116) may be directly connected to the server system (110) or may be connected to the server system (110) via a network (not shown).

Figure 2:
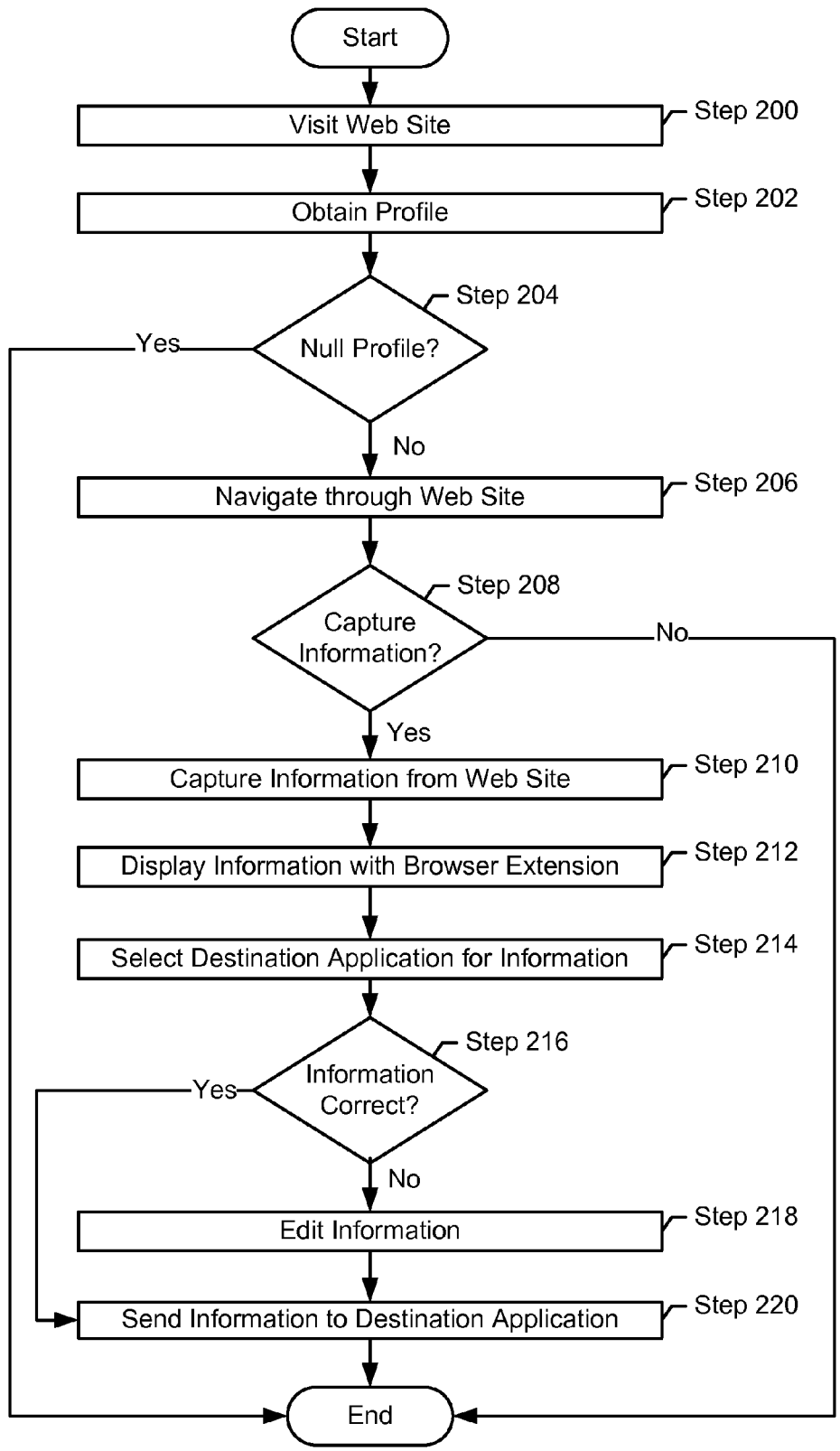
FIGS. 2-4 show flowcharts for capturing information from a web site in accordance with one or more embodiments of the invention.
Figure 3:
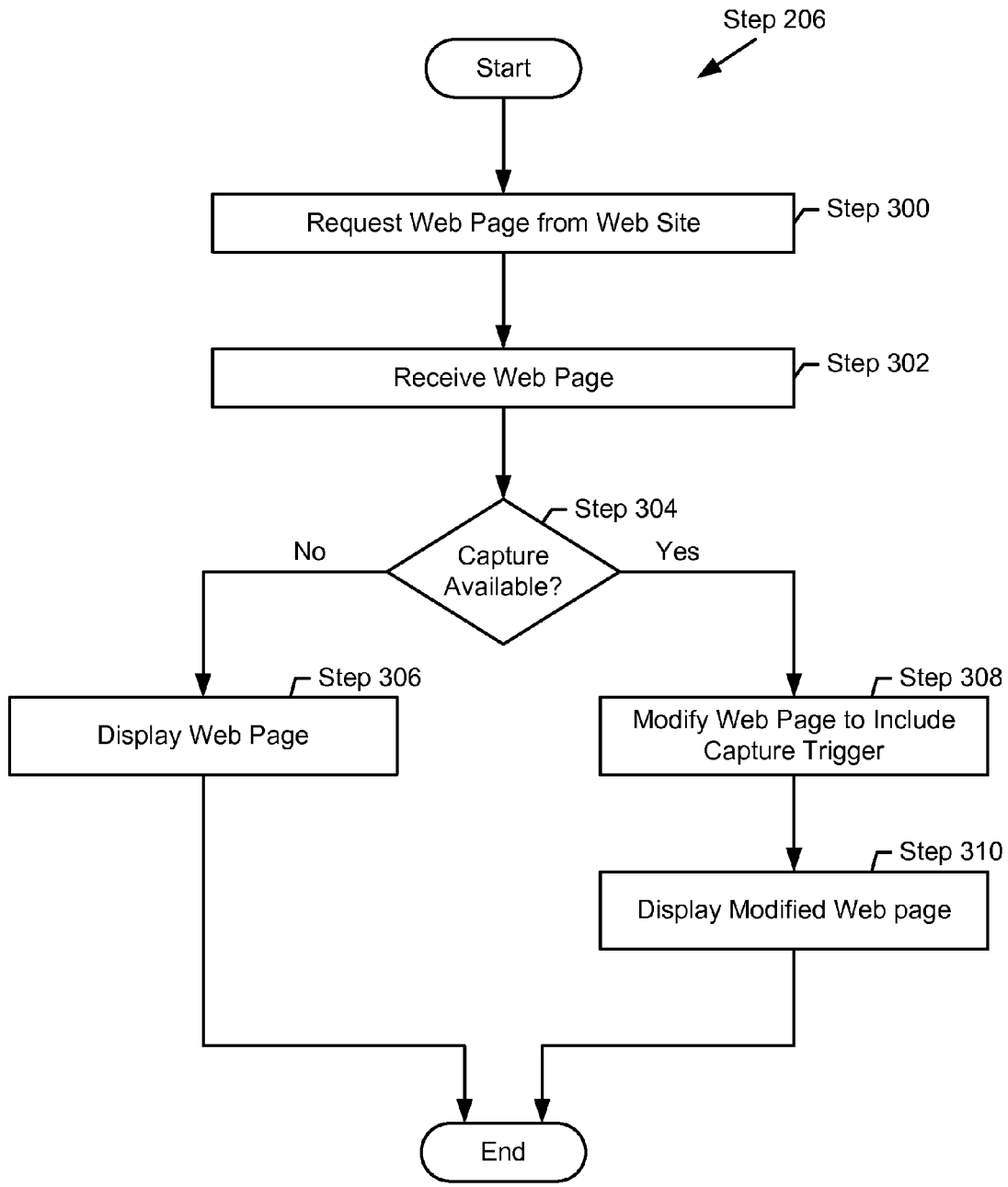
Figure 4:
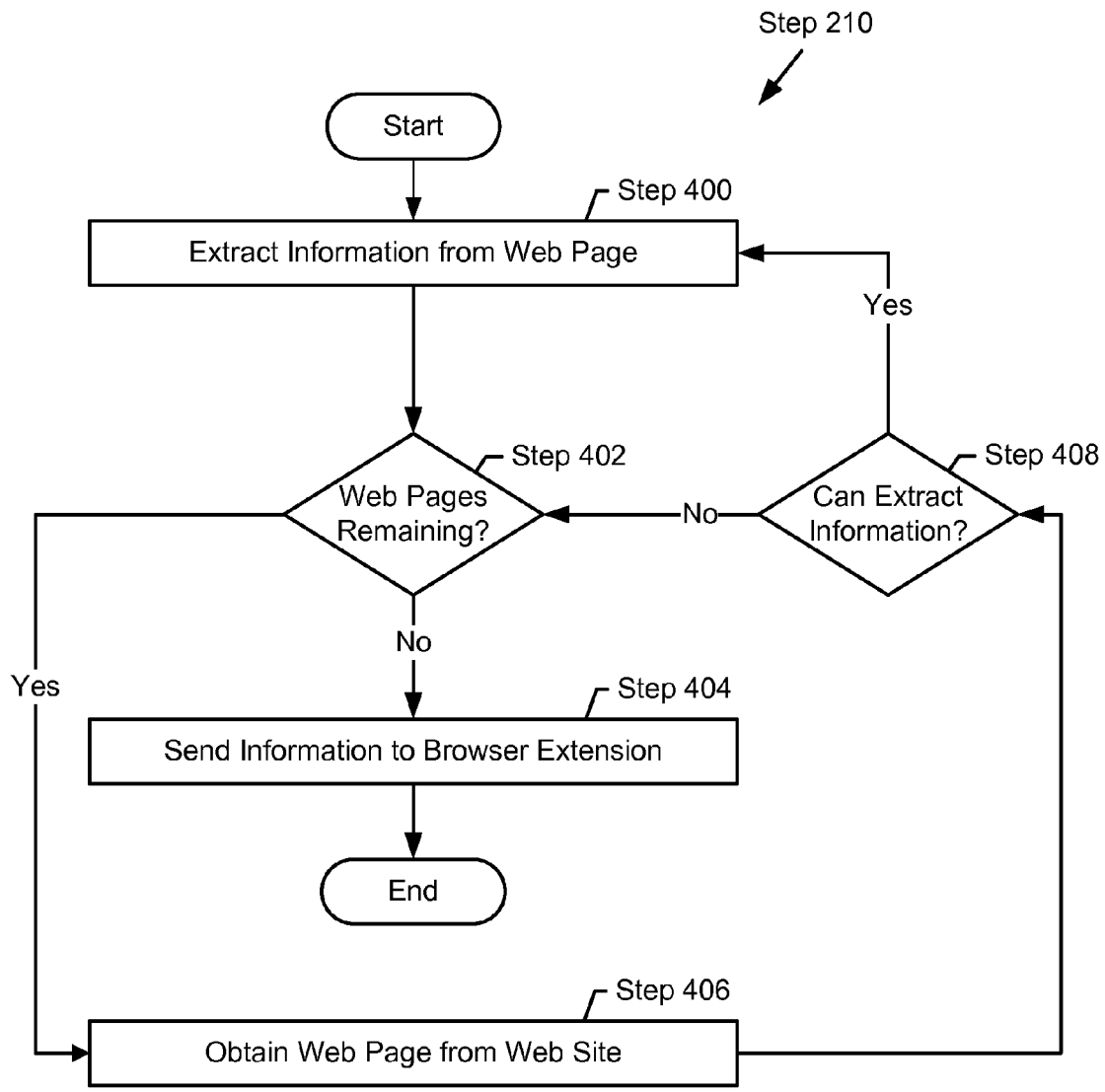

FIGS. 2-4 show flowcharts of methods for sending application commands and receiving event messages. While the various steps in these flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIGS. 2-4 should not be construed as limiting the scope of the invention.

FIG. 2 shows a flowchart for extracting user information from a web site and sending the extracted information to a destination application. Initially, at Step 200, the user navigates to a web site. For example, the user may enter a URL into the browser's navigation bar or select a bookmark from the browser's bookmarks folder to visit a web site.

The browser module observes that the browser has navigated to a new web site, and obtains a profile associated with the web site (Step 202). Profiles are obtained by requesting a profile associated with the web site from the profile service executing on a remote server system. Requests for profiles are placed from the browser module to the profile service in any format that may support the communication of profile information. For example, profile requests from the browser module may be fulfilled by the profile service using the web Services Definition Language (WSDL), a remote procedure call (RPC), HTTP GET/POST operations, JavaScript® Object Notation (JSON) (JavaScript® is a registered trademark of Sun Microsystems, Inc. of Santa Clara, Calif.), and/or structured query language (SQL) queries.

In one or more embodiments of the invention, a null profile is returned when no profile information exists for the specified web site. At Step 204, a determination is made about whether a null profile was returned; when the null profile is returned, no information may be extracted from the web site and the flow ceases.

Alternatively, in one or more embodiments of the invention, when the returned profile is not null, the profile is cached locally by the browser module while the user navigates through the web site (Step 206). Web pages from the web site may be modified by the browser module during user navigation of the web site. Navigating the web site is further described below in relation to FIG. 3.

Continuing with FIG. 2, at Step 208 the browser module determines whether to capture information from the web site (Step 210). In one or more embodiments of the invention, when the user declines to capture information from the web site the capture process ends. When the user provides a positive indication to the browser module to capture information from the web site, the browser module captures information from the web site. Examples of a positive indication may include a user selecting a "proceed" button, marking a checkbox, clicking on a button inserted by the browser module within the actual web page itself, clicking on a button placed on the browser's toolbar by the browser module to direct the browser module to capture information from the web site, selecting an additional menu item from the browser (102) tool bar, right-clicking a mouse to trigger a pop-up menu in the browser and then subsequently selecting an item from the pop-up menu, or otherwise choosing a selection intending a positive result. In one embodiment of the invention, the user has the ability to activate and de-activate the browser module.

At Step 210 the browser module captures information from the web site using the extraction module and the retrieved profile. For example, the extraction module may apply a regular expression from the profile to the HTML of a web page from financial institution's web site to extract a balance for the user. Capturing information from the web site is shown and further discussed below in relation to FIG. 4. In one embodiment of the invention, the browser module may also include functionality to capture information using XFORMS and/or Microformats.

In one embodiment the invention, the extracted information may include, but is not limited to, financial data, healthcare data, personal data, and geographic data. Further, the financial data may include, but is not limited to, a credit statement, an invoice, a receipt, and a tax statement In one or more embodiments of the invention, subsequent to successfully capturing information from the web site, the captured information is displayed to the user (Step 212) via a GUI dialog presented from the browser module. The GUI dialog is also configured to include a mechanism for selecting the destination application for the captured information (Step 214). For example, a GUI drop-down menu may be shown populated with compatible destination applications for the captured information. In one embodiment of the invention, the GUI dialog presented to the user may be defined in the profile (i.e., the profile obtained in Step 202). Alternatively, the GUI dialog presented to the user may be defined in the during by the browser module (for example during setup of the browser module).

After selecting the destination application (Step 214), the user determines whether the information presented in the dialog is correct (Step 216). If the captured information is correct, the captured information is sent to the destination application (Step 220). When the user determines that the information is not correct, the user may use the dialog presented by the browser module to edit the captured information (Step 218). For example, the user may wish to place an expense item from an online credit card statement in a spending category that is more specific than the one provided by the credit card web site. Examples of GUI interfaces for captured web site information are described in more detail below in relation to FIGS. 6-7.

In one or more embodiments of the invention, the captured information is sent to the destination application (Step 220) after the captured information has been confirmed as correct (Step 216) or after the user has successfully edited the captured information (Step 218). One of ordinary skill in the art will appreciate that the captured information may be placed into an acceptable format prior to being sent to the destination application (Step 218). For example, the captured information may be converted into a generalized format, such as Comma-Separated Values (CSV) and/or XML; the captured information may also be converted into a specific object compatible with the application's internal components using Common Object Request Broker Architecture (CORBA).

FIG. 3 shows a flowchart for navigating a web site in accordance with one or more embodiments of the invention. FIG. 3 expands the step of navigation through the web site (Step 206) of FIG. 2. At Step 300, the user requests a web page from the web site, which is received by the browser (Step 302). In one or more embodiments of the invention, the browser module intercepts the regular rendering process of the browser to examine the web page and determine whether information may be captured (Step 304). For example, if a null profile was received for the web site, information may not be captured and the web pages contents are given back to the browser to display (Step 306) to the user. Similarly, the web page is displayed to the user (Step 306) when a valid profile received from the profile service does not apply to the web page. For example, a profile corresponding to a financial institution's web page may apply only to web pages including account information for the user from the financial institution, ignoring the web pages populated with press releases.

In one or more embodiments of the invention, when a determination in made, using the profile, that the web page includes information that may be captured, the web page may be modified to include some form of a positive indication, such as a capture trigger (Step 308). In one or more embodiments of the invention, the capture trigger provides a visual mechanism, embedded into the web page, which notifies the user of embedded information within the page that may be captured. For instance, the browser module may insert a <BUTTON> HTML element as the capture trigger into the HTML code of the web page that, when pressed, executes JavaScript® that may invoke the GUI dialog for selecting a destination application and/or editing the captured information. In one embodiment of the invention, the browser module uses the profile to determine where to insert the capture trigger. The modified web page is subsequently provided to the browser by the browser module and displayed to the user (Step 310).

In alternative embodiments of the invention, the capture trigger may be manifested in the activation of a button placed in the browser by the browser module, with no modification of the web page. For example, a button labeled "Capture Page" may become active by lighting up from an inactive (i.e. greyed-out) state.

FIG. 4 shows a flowchart for capturing information from a web site in accordance with one or more embodiments of the invention, and expands the step of capturing information from the web site (Step 210) of FIG. 2. At step 400, information is first extracted from the web page by the extraction module using the profile obtained from the profile service. As discussed above in relation to FIG. 1, profiles may be any suitable format that includes information relating to parsing web site information including, but not limited to, regular expressions, Bachus-Naur form grammars, XSLT templates, and/or JavaScript® functions. For example, the profile may include the regular expression "Total: (\ d+)", that allows for extraction of a string of numerical digits that come after the text "Total," and may be used to extract a numerical total from a web page's content. In another example, JavaScript® routines may be included in the profile that, when executed by the browser, may access the Document Object Model (DOM) of the web page to retrieve specific content information.

One of ordinary skill in the art will appreciate that profiles may need to be updated because of the frequent updating of content, and that the profiles are not limited to extracting only HTML data. For example, profiles may be used to extract information from non-HTML files associated with the web page, including ActionScript® (ActionScript® is registered trademark of Adobe Systems, Incorporated of San Jose, Calif.), JavaScript®, XML, and/or Cascading Style Sheets (CSS).

Continuing with FIG. 4, the browser module then determines whether there are additional web pages remaining for information to be extracted (Step 402). In one or more embodiments of the invention, the extraction module includes functionality to extract information that is paginated across multiple web pages. For example, many financial institutions do not display an entire credit card statement on the same web page. In such conditions, the profile for the financial institution web site includes information to instruct the extraction module to obtain the next page from the web site (Step 406) when a determination is made that additional pages remain (Step 402).

In one or more embodiments of the invention, subsequent web pages obtained from the web site (Step 406) by the extraction module may be tested for whether additional information may be extracted (Step 408). Steps 400-408 will be repeated when the web page includes information that may be extracted. Otherwise, the information extracted from the one or more web pages is sent to the browser module (Step 404) to be displayed to the user.

Figure 5:
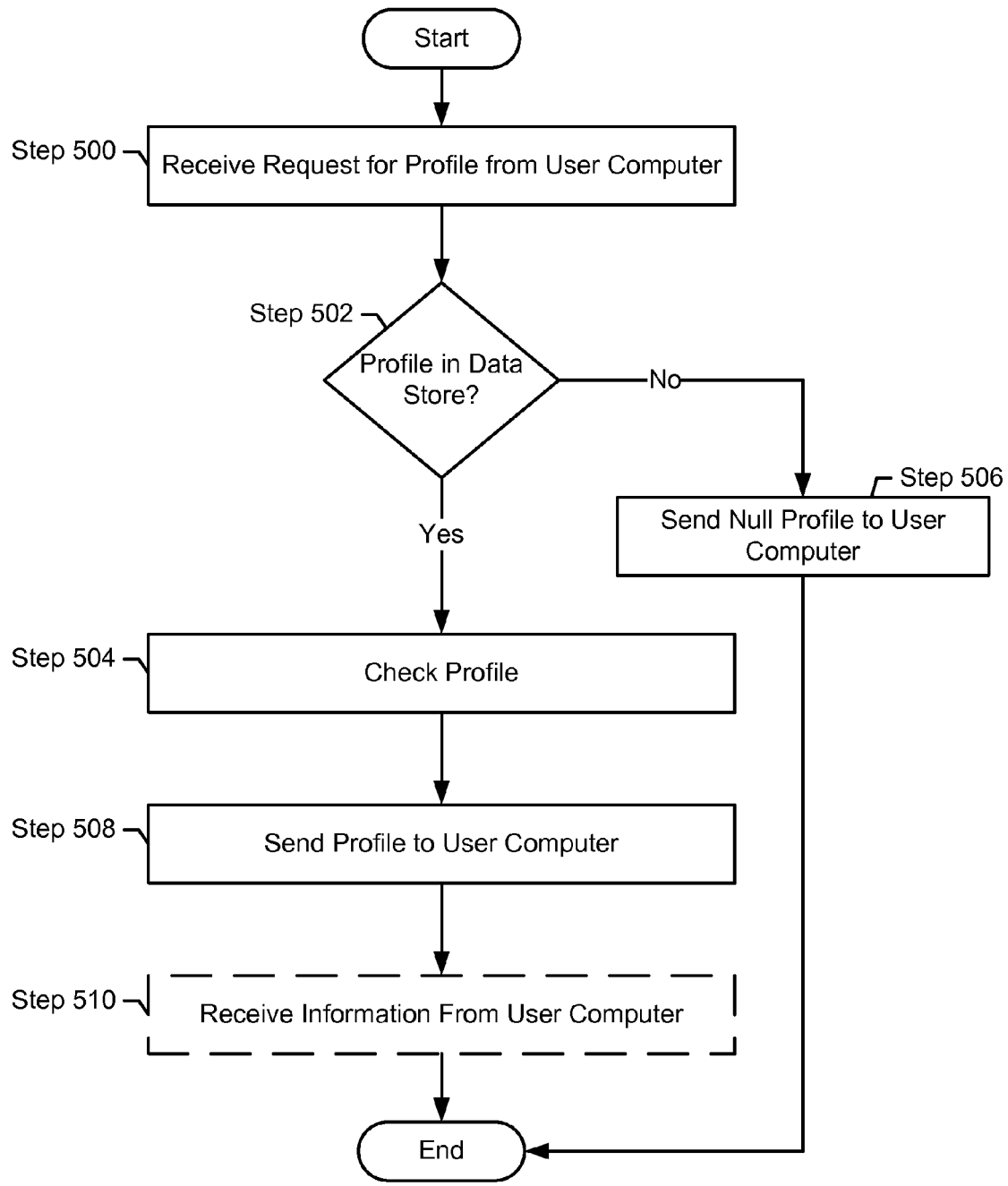
FIG. 5 shows a flowchart for sending a profile in accordance with one or more embodiments of the invention.

FIG. 5 shows a flowchart for sending a profile in accordance with one or more embodiments of the invention. At Step 500, the profile service receives a profile request from the user computer for a web site. The profile service receives and processes the request, and queries the profile data store. For example, if the profile data store is stored within a relational database, the profile service may construct a Structured Query Language (SQL) query to search the profile data store for a profile matching the web site in the request.

A query sent by the profile service is evaluated on the profile data store to determine whether the profile exists (Step 502). If no profile associated with the web site exists, a null (or empty) profile is sent back to the browser module on the user computer (Step 506). If the profile exists, the profile is then checked to verify that it includes the latest information for the web site (Step 504). After verification, the profile is sent to the browser module on the user computer (Step 508). In the event that the web site has been updated since the last time the profile was updated, the browser module may be notified that the profile is not up-to-date. In addition, Step 504 may trigger notification to the profile service company to update the profile for the web site.

Continuing with the discussion of FIG. 5, in one or more embodiments of the invention, the server system may receive the extracted information from the browser module on the user computer (Step 510). When the extracted information is received, it may be sent to an application resident on the server system. Step 510 is optional because, in one or more embodiments of the invention, the application may not be present on the server system.

Figure 6A:
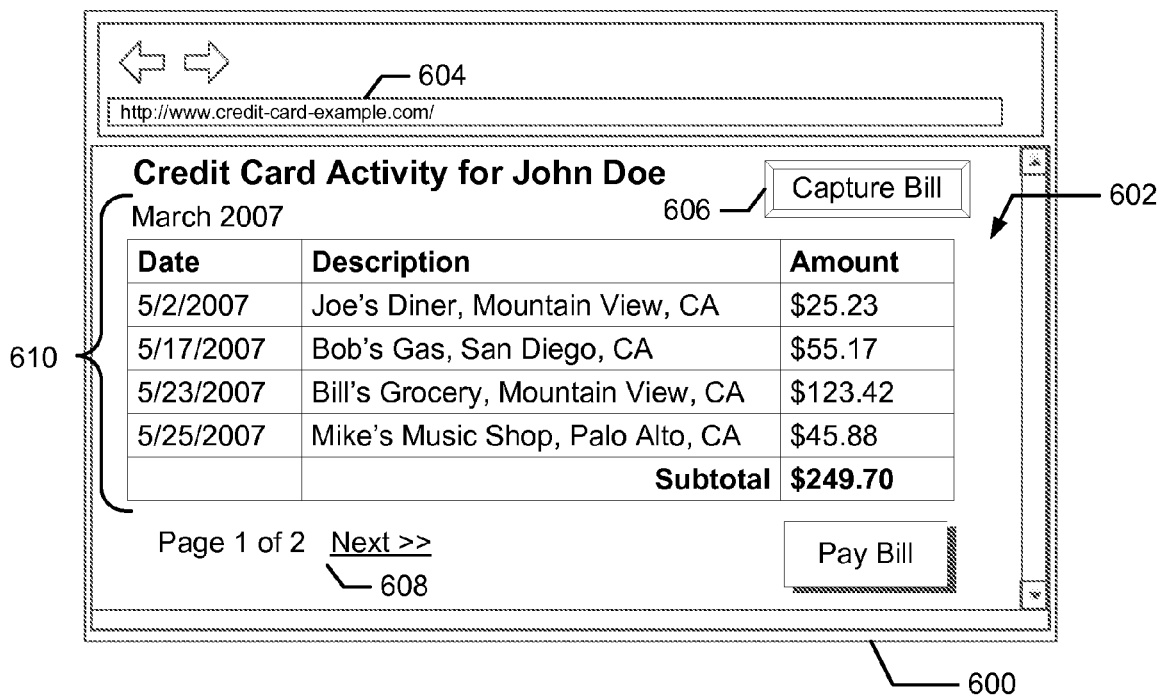
FIGS. 6A, 6B, 7A, and 7B show examples for capturing information from a web site in accordance with one or more embodiments of the invention.

FIGS. 6A-6B and 7A-7B show examples in accordance with one or more embodiments of the invention. FIGS. 6A-6B and 7A-7B are exemplary and are not intended to limit the scope of the invention. FIG. 6A shows a modified financial institution web site in accordance with one or more embodiments of the invention. The user directs the browser (600) to visit the URL (604) for the financial institution that holds the user's credit card information. The browser module (not shown) retrieves a profile associated with the financial institution web site, and the user proceeds to log into the web site using authentication credentials (e.g., user name and password).

Upon navigating to the statement web page (602), the browser module determines that financial information (610) exists on the web page (602) that may be captured into the user's financial application (not shown). The browser module modifies the financial institution's web page (602) to include a "Capture Bill" button (606), and presents the modified web page (602) to the user.

The user, wishing to analyze the credit card transactions within their financial application, clicks the "Capture Bill" button (606). Clicking the "Capture Bill" button (606) causes the extraction module to extract the financial information (610) from the financial institution web page using the retrieved profile. In one or more embodiments of the invention, when the financial information (610) extends across multiple pages (608), the extraction module is able to retrieve and extract the financial information from the subsequent paginated web pages.

Figure 6B:
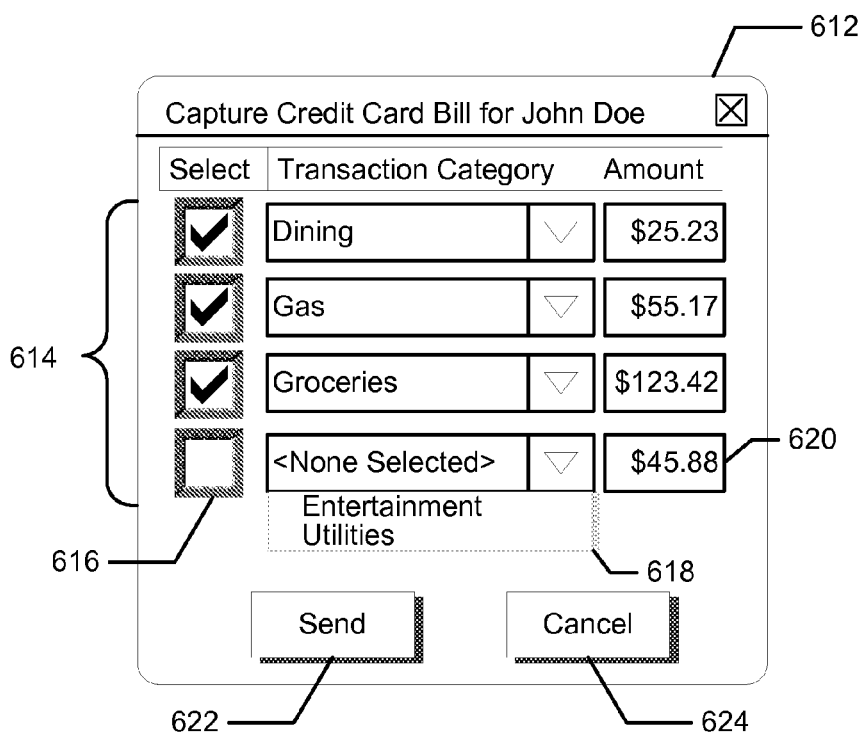

FIG. 6B shows a graphical user interface (GUI) dialog (620) presented by the browser module in accordance with one or more embodiments of the invention. In one embodiment of the invention, the layout and functionality of the GUI is defined by the profile. Continuing with the discussion of FIG. 6B, GUI elements such as drop down menus (e.g., 618), text fields (e.g., 620), and radio boxes (616) may be used to edit and/or correct the financial information captured from the web site (614). The GUI may be a web page in a web browser, a window in a stand-alone end-user application, or any other type of interactive computer display. The GUI (612) facilitates the user's editing of captured information. For example, the inclusion check box (616) allows the user to prevent entire transactions from being sent to the destination application with a single click. A transaction type drop down menu (618) may be used to quickly select the type of the credit card transaction sent to the financial application. In FIG. 6B, the transaction type drop down menu (618) lists the "Entertainment" and "Utilities" as credit card transaction types. Those skilled in the art will recognize that additional credit card transaction types may be added to the drop down menu (618). The credit card transaction amount text field (620) may be used to customize the extracted amount from the financial institution web page.

In one or more embodiments of the invention, upon completing editing of the captured financial information (614), the user may click the "Send" button (622) to propagate the captured information to the financial application. Alternatively, the user may abort sending the captured information by clicking the "Cancel" button (624).

Figures 7A, 7B:
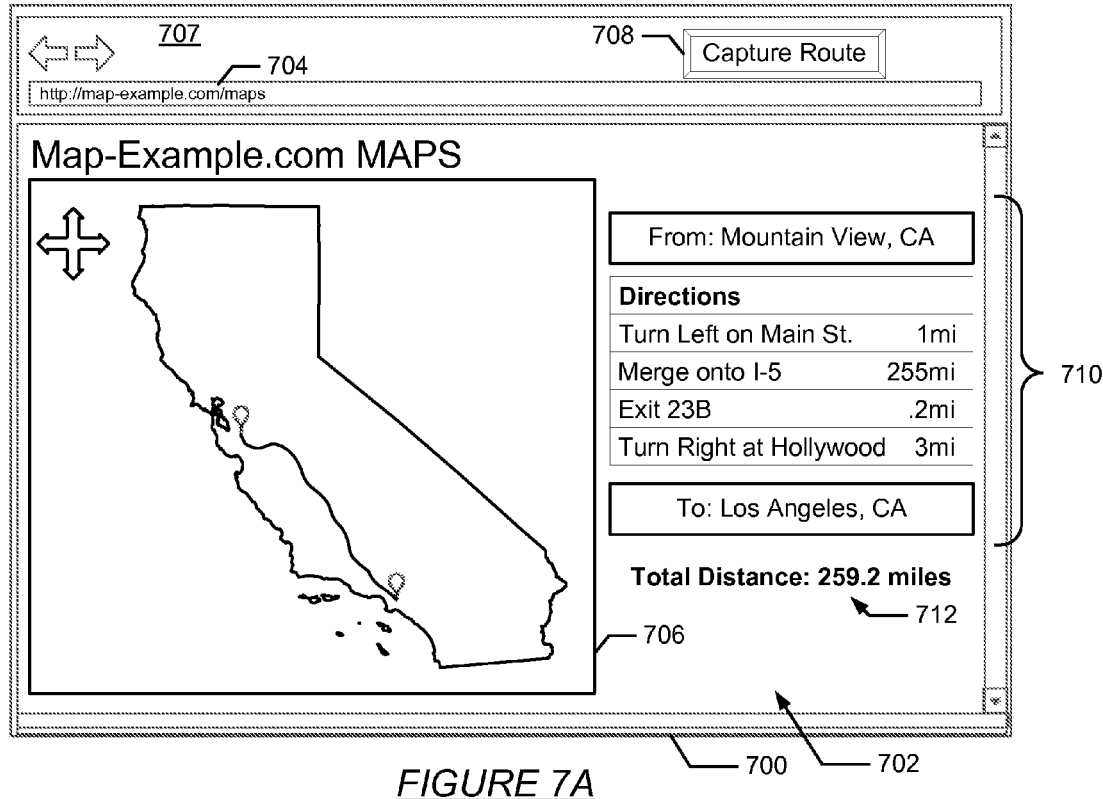

FIG. 7A shows a mapping web page in accordance with one or more embodiments of the invention. The user directs the browser (700) to visit the URL (704) for the mapping web site. In this example, the mapping web site is a non-financial web site. In one embodiment of the invention, a non-financial web site is any web site that is not designated as a financial website. In one embodiment of the invention, the financial web site is any web site which is used to track a financial account. Examples of financial web sites include, but are not limited to, a credit card web site, a brokerage web site, and a bank web site. The same definitions may be applied to applications that are not web sites (e.g., destination applications, as described above in FIG. 1).

Continuing with the example, the browser module (not shown) retrieves a profile associated with the mapping web site, and the user proceeds to create a map (706) showing the user's business trip route from Mountain View, Calif. to Los Angeles, Calif. The captured information may be used by the user to generate an expense report.

Prior to displaying web page, the browser module retrieves a profile associated with the mapping web site, and the extraction module uses the profile to determine that route information (710) and distance information (712) may be captured from web page. Upon receipt of the profile, the browser module then activates the a "Capture Route" button (708) in the toolbar (707), and displays the web page (702) to the user. The user, wishing to record mileage information about the business trip, clicks on the "Capture Route" button (708) to initiate the capture dialog.

FIG. 7B shows a graphical user interface (GUI) dialog (714) to capture mapping routes presented by the browser module in accordance with one or more embodiments of the invention. Because the captured information may be used by multiple applications, a destination application drop down menu (716) is used to quickly select the application to which the user wants to send the captured information. In this example, the potential destination applications include: a financial application (QuickBooks®), a travel application, a spreadsheet, and a Geographical Information Systems (GIS) data viewer In one embodiment of the invention, the profile includes the list of potential destination applications. Further, the profile includes information about the format data each of the destination applies requires and how to convert the captured data into the appropriate format based on the selected destination application.

Continuing with FIG. 7B, the GUI also includes the captured distance (718) and captured route (720) from the mapping web page (702). In one or more embodiments of the invention, the browser module may capture the route (720) in a format used by GIS applications. In this example, the captured route (720) is presented in the Well-Known Text (WKT) format specified by the Open Geospatial Consortium (OGC®) (OGC® is a registered trademark of the Open Geospatial Consortium, Inc. of Wayland, Mass.).

Though not shown in FIG. 7B, in one embodiment of the invention, once the destination application is chosen, the browser module may perform a query to the destination application to obtain application specific information to allow the user to further modify/annotate the captured data prior to sending it to the destination application. For example, if QuickBooks® is selected as the destination application, the browser module could send a query to QuickBooks® to obtain additional fields in the GUI to allow the user to specify customer and/or what job item the trip was for. In one embodiment of the invention, specifying the customer may include providing, via the GUI, a list of customers currently listed in QuickBooks®. Based on information received from the query, the GUI may include a dropdown menu for each of the additional fields, where the values (i.e., customer names and/ or job items) presented to the user are obtained from QuickBooks®. In one embodiment of the invention, the information obtained from QuickBooks® is specific to the user.

In one or more embodiments of the invention, upon the completion of editing the captured route (720) and distance (718) information, the user may click the "Send" button (722) to send the captured information to the selected application. Alternatively, the user may abort sending the captured information by clicking the "Cancel" button (724).

Figure 8:
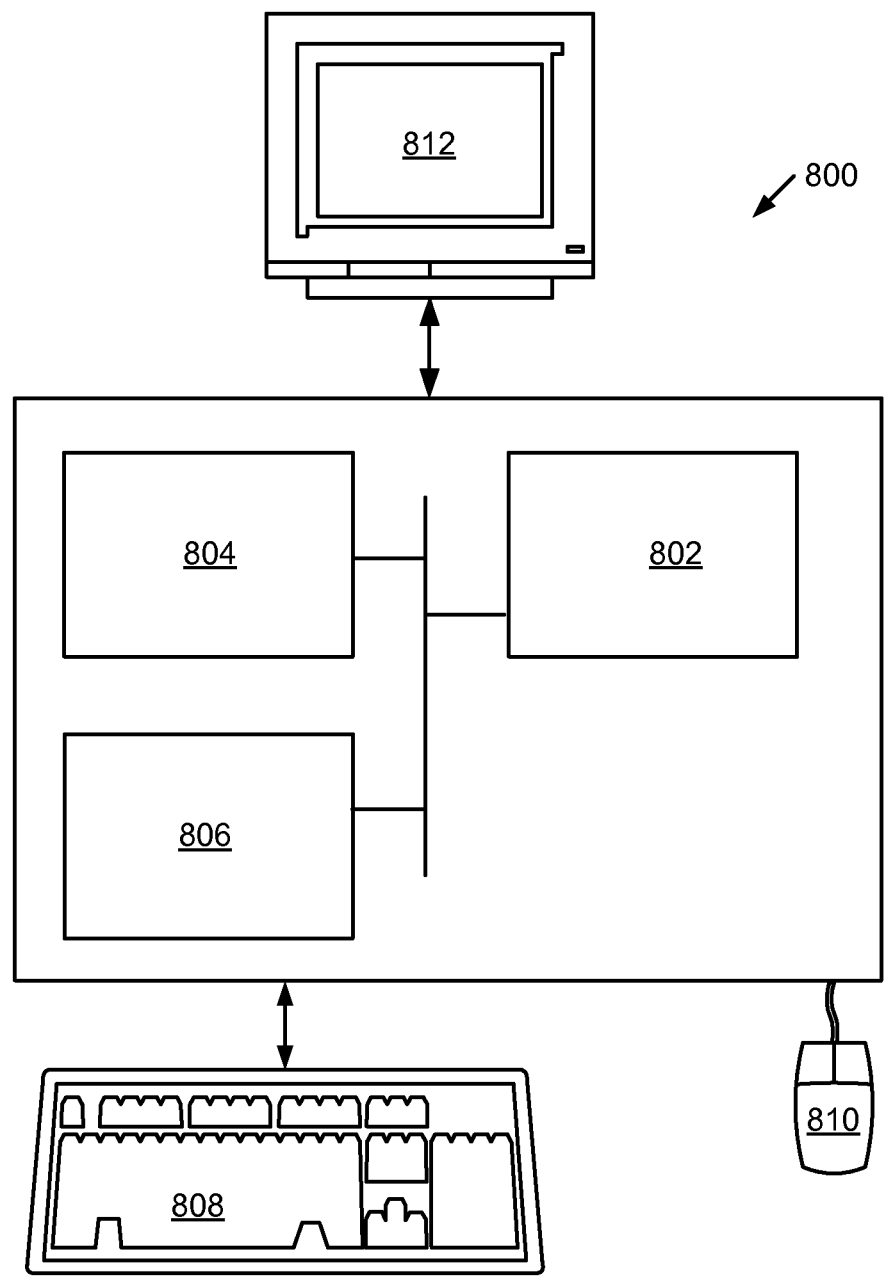
FIG. 8 shows a computer system in accordance with one or more embodiments of the invention.

The invention may be implemented on virtually any type of computer (including mobile devices) regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., the destination application, profile service, and profile data store) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for capturing information from a web application, comprising:

receiving, using a web browser executing on a user computer, a request for a travel route from a user, wherein the request comprises an origin location and a destination location;

displaying, to the user, a web page of the web application comprising the travel route, wherein the travel route comprises a travel distance;

identifying a profile corresponding to the web application;

executing, by a computer processor on the user computer and in response to the identifying the profile, a browser module of the web browser;

retrieving the travel route from the web page of the web application according to the profile;

displaying, to the user by the browser module and concurrently with the web page, a graphical user interface (GUI) element for accessing a financial application executing on the user computer, wherein the GUI comprises the travel route;

receiving a first selection of the GUI element from the user;

identifying, within the profile, a plurality of credentials for accessing the financial application;

sending, in response to the first selection, a request to the financial application for a plurality of application specific options allowing the user to annotate the travel route for storage by the financial application;

receiving the plurality of application specific options from the financial application in response to the request;

displaying the plurality of application specific options to the user;

receiving a second selection of at least one of the plurality of application specific options from the user, wherein the message further comprises the customer account;

generating, after receiving the first selection, a message comprising the plurality of credentials, the travel distance of the travel route, and the at least one of the application specific options; and sending the message to the financial application, wherein the financial application uses the plurality of credentials to authenticate the user and generates an expense report based on the message.

2. The method of claim 1, further comprising:
displaying, in response to receiving the first selection of the GUI element, a dialog box comprising a plurality of destination applications to the user, wherein the plurality of destination applications comprises the financial application;
receiving a third selection of the financial application in response to displaying the dialog box; and
receiving, from the user, a confirmation of the dialog box, wherein the message is sent to the financial application in response to the confirmation.

3. The method of claim 1, further comprising:
displaying, in response to receiving the first selection of the GUI element, a dialog box comprising a travel date field and a distance field, wherein the distance field is pre-populated with the travel distance;
receiving, from the user, an input of a travel date into the travel date field; and
receiving, from the user, a confirmation of the dialog box, wherein the message further comprises the travel date, and wherein the message is sent to the financial application in response to the confirmation.

4. The method of claim 1, further comprising:
sending, in response to the first selection, a request to the financial application for a list of customer accounts;
receiving the list of customer accounts from the financial application in response to the request;
displaying the list of customer accounts to the user; and
receiving a selection of a customer account of the list of customer accounts from the user, wherein the message further comprises the customer account.

5. The method of claim 1, further comprising:
sending, in response to the first selection, a request to the financial application for a list of jobs;
receiving the list of jobs from the financial application in response to the request;
displaying the list of jobs to the user; and
receiving a selection of a job of the list of jobs from the user, wherein the message further comprises the job.

6. The method of claim 1, further comprising:
receiving, from the user, the plurality of credentials for accessing the financial application, wherein the plurality of credentials are sent to the financial application with the travel distance.

7. The method of claim 1, further comprising:
receiving, by the browser module, the travel distance of the travel route from the web application prior to sending the travel distance of the travel route to the financial application.

8. The method of claim 1, wherein the GUI element is one selected from a group consisting of a button and a hyperlink.

9. The method of claim 1, wherein the browser module is a third party plugin.

10. A non-transitory computer readable medium comprising a plurality of instructions for capturing information from a web application, the plurality of instructions comprising functionality to:
receive, using a web browser executing on a user computer, a request for a travel route from a user, wherein the request comprises an origin location and a destination location;
display, to the user, a web page of the web application comprising the travel route, wherein the travel route comprises a travel distance;
identify a profile corresponding to the web application;
execute, in response to the identifying the profile, a browser module of the web browser;
retrieve the travel route from the web page of the web application according to the profile;
display, to the user by the browser module and concurrently with the web page, a graphical user interface (GUI) element for accessing a financial application executing on the user computer, wherein the GUI element comprises the travel route;
receive a first selection of the GUI element from the user;
identify, within the profile, a plurality of credentials for accessing the financial application;
send, in response to the first selection, a request to the financial application for a plurality of application specific options allowing the user to annotate the travel route for storage by the financial application;
receive the plurality of application specific options from the financial application in response to the request;
display the plurality of application specific options to the user;
receive a second selection of at least one of the plurality of application specific options from the user, wherein the message further comprises the customer account;
generate, after receiving the first selection, a message comprising the plurality of credentials, the travel distance of the travel route, and the at least one of the application specific options; and
send the message to the financial application, wherein the financial application uses the plurality of credentials to authenticate the user and generates an expense report based on the message.

11. The non-transitory computer readable medium of claim 10, wherein the plurality instructions further comprise functionality to:
display, in response to receiving the first selection of the GUI element, a dialog box comprising a plurality of destination applications to the user, wherein the plurality of destination applications comprises the financial application;
receive a third selection of the financial application in response to displaying the dialog box; and
receive, from the user, a confirmation of the dialog box, wherein the message is sent to the financial application in response to the confirmation.

12. The non-transitory computer readable medium of claim 10, wherein the plurality instructions further comprise functionality to:
display, in response to receiving the first selection of the GUI element, a dialog box comprising a travel date field and a distance field, wherein the distance field is pre-populated with the travel distance;
receive, from the user, an input of a travel date into the travel date field; and
receive, from the user, a confirmation of the dialog box, wherein the message further comprises the travel date, and wherein the message is sent to the financial application in response to the confirmation.

13. The non-transitory computer readable medium of claim 10, wherein the plurality instructions further comprise functionality to:
send, in response to the first selection, a request to the financial application for a list of customer accounts;

receive the list of customer accounts from the financial application in response to the request;

display the list of customer accounts to the user; and receive a selection of a customer account of the list of customer accounts from the user, wherein the message further comprises the customer account.

14. The non-transitory computer readable medium of claim 10, wherein the plurality instructions further comprise functionality to:

send, in response to the first selection, a request to the financial application for a list of jobs;

receive the list of jobs from the financial application in response to the request;

display the list of jobs to the user; and receive a selection of a job of the list of jobs from the user, wherein the message further comprises the job.

15. The non-transitory computer readable medium of claim 10, wherein the plurality instructions further comprise functionality to:

receive, from the user, the plurality of credentials for accessing the financial application, wherein the plurality of credentials are sent to the financial application with the travel distance.

16. The non-transitory computer readable medium of claim 10, wherein the plurality instructions further comprise functionality to:

receive, by the browser module, the travel distance of the travel route from the web application prior to sending the travel distance of the travel route to the financial application.

17. The non-transitory computer readable medium of claim 10, wherein the GUI element is one selected from a group consisting of a button and a hyperlink.

18. The non-transitory computer readable medium of claim 10, wherein the browser module is a third party plugin.

19. A system for capturing information from a web application, comprising:

a computer processor;

a web browser executing on the computer processor and configured to:

receive a request for a travel route from a user, wherein the request comprises an origin location and a destination location;

display, to the user, a web page of the web application comprising the travel route, wherein the travel route comprises a travel distance;

identify a profile corresponding to the web application;

execute, on the computer processor and in response to the identifying the profile, a browser module of the web browser; and receive a first selection of a graphical user interface (GUI) element from the user, wherein the browser module executes on the computer processor is configured to:

retrieve the travel route from the web page of the web application according to the profile;

display, to the user concurrently with the web page, the GUI element for accessing a financial application executing on the computer processor, wherein the GUI element comprises the travel route;

identify, within the profile, a plurality of credentials for accessing the financial application;

send, in response to the first selection, a request to the financial application for a plurality of application specific options allowing the user to annotate the travel route for storage by the financial application;

receive the plurality of application specific options from the financial application in response to the request;

display the plurality of application specific options to the user;

receive a second selection of at least one of the plurality of application specific options from the user, wherein the message further comprises the customer account;

generate, after receiving the first selection, a message comprising the plurality of credentials, the travel distance of the travel route, and the at least one of the application specific options; and send the message to the financial application, wherein the financial application uses the plurality of credentials to authenticate the user and generates an expense report based on the message.

20. The system of claim 19, wherein the financial application is configured to:

receive the message; and generate the expense report by:

identifying a predefined expense rate associated with the travel route;

calculating an expense amount, wherein the expense amount is a product of the travel distance and the predefined expense rate; and creating an expense transaction comprising the expense amount.

21. The system of claim 19, wherein the browser module is further configured to:

display, in response to receiving the first selection of the GUI element, a dialog box comprising a plurality of destination applications to the user, wherein the plurality of destination applications comprises the financial application;

receive a third selection of the financial application in response to displaying the dialog box; and receive, from the user, a confirmation of the dialog box, wherein the message is sent to the financial application in response to the confirmation.

22. The system of claim 19, wherein the browser module is further configured to:

display, in response to receiving the first selection of the GUI element, a dialog box comprising a travel date field and a distance field, wherein the distance field is pre-populated with the travel distance;

receive, from the user, an input of a travel date into the travel date field; and receive, from the user, a confirmation of the dialog box, wherein the message further comprises the travel date, and wherein the message is sent to the financial application in response to the confirmation.

23. The system of claim 19, wherein the browser module is further configured to:

send, in response to the first selection, a request to the financial application for a list of customer accounts;

receive the list of customer accounts from the financial application in response to the request;

display the list of customer accounts to the user; and receive a selection of a customer account of the list of customer accounts from the user, wherein the message further comprises the customer account.

24. The system of claim 19, wherein the browser module is further configured to:

send, in response to the first selection, a request to the financial application for a list of jobs;

receive the list of jobs from the financial application in response to the request;

display the list of jobs to the user; and receive a selection of a job of the list of jobs from the user, wherein the message further comprises the job.

25. The system of claim 19, wherein the browser module is further configured to:
   receive, from the user, the plurality of credentials for accessing the financial application, wherein the plurality of credentials are sent to the financial application with the travel distance.

26. The system of claim 19, wherein the browser module is further configured to:
   receive the travel distance of the travel route from the web application prior to sending the travel distance of the travel route to the financial application.

27. The system of claim 19, wherein the GUI element is one selected from a group consisting of a button and a hyperlink.

28. The system of claim 19, wherein the financial application is a web application.

* * * * *